(12) United States Patent
Sato et al.

(10) Patent No.: US 12,194,941 B1
(45) Date of Patent: Jan. 14, 2025

(54) VEHICLE

(71) Applicant: MAZDA MOTOR CORPORATION, Hiroshima (JP)

(72) Inventors: Chikara Sato, Hiroshima (JP); Xiaoguang Liu, Hiroshima (JP); Shiori Tontani, Hiroshima (JP); Ayumi Hamamoto, Hiroshima (JP); Kansei Yamaguchi, Hiroshima (JP); Hideharu Kaeriyama, Hiroshima (JP); Nozomi Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/753,222

(22) Filed: Jun. 25, 2024

(30) Foreign Application Priority Data

Jul. 11, 2023 (JP) .................. 2023-113685

(51) Int. Cl.
*B60R 21/205* (2011.01)
*B60R 21/215* (2011.01)

(52) U.S. Cl.
CPC .......... *B60R 21/205* (2013.01); *B60R 21/215* (2013.01)

(58) Field of Classification Search
CPC ............................ B60R 21/205; B60R 21/215
See application file for complete search history.

(56) References Cited

U.S. PATENT DOCUMENTS 7,261,318 B2 * 8/2007 Enders ................. B60R 21/206
280/752

FOREIGN PATENT DOCUMENTS

| DE | 102005033764 A1 | * | 1/2007 | ........... B60R 21/206 |
| DE | 102016014877 A1 | * | 6/2017 | ........... B60R 21/206 |
| DE | 202019103440 U1 | * | 8/2019 | ........... B60R 21/206 |
| JP | H11105660 A | * | 4/1999 | ........... B60R 21/206 |
| JP | 2010076583 A | * | 4/2010 | |
| JP | 4935646 B2 | | 5/2012 | |
| KR | 20100091574 A | * | 8/2010 | ........... B60R 21/205 |

* cited by examiner

*Primary Examiner* — Faye M Fleming
(74) *Attorney, Agent, or Firm* — Studebaker & Brackett PC (57) ABSTRACT

A vehicle ensures deployment stability of a compact knee airbag while improving design flexibility, by disposing the knee airbag in a lower portion of a storage box. The vehicle includes a knee airbag arranged in front of a passenger seat in a lower portion of a glove box. The glove box has a housing which is fixed to an instrument panel by a plurality of support portions and which demarcates a storage space. An instrument panel member fixed to the vehicle body is disposed above a ceiling wall of the housing. The ceiling wall has a displacement regulation wall portion which bulges upward compared to another portion of the ceiling wall and is spaced apart from the instrument panel member such that the displacement regulation wall portion abuts the instrument panel member when the knee airbag is deployed.

14 Claims, 10 Drawing Sheets

VEHICLE

TECHNICAL FIELD

The present disclosure relates to a vehicle and particularly to a vehicle including a knee airbag in a storage box lower portion on a passenger seat side.

BACKGROUND

Among vehicles, there is a vehicle which includes a knee airbag for protecting a knee of an occupant from an impact in a collision. A vehicle disclosed in Japanese Patent No. 4935646 has a configuration in which a knee airbag is housed in a lower portion of a glove box.

In the vehicle disclosed in Japanese Patent No. 4935646, the knee airbag is disposed in a lower portion of a storage space in the glove box (storage box), and a bottom panel partitions the knee airbag from the storage space. Further, an outer panel arranged on an occupant side in the glove box is provided with a fracture line which is fractured such that the knee airbag can be deployed to an inside of a vehicle cabin in a vehicle collision or the like.

SUMMARY

However, a knee airbag of the above-discussed Japanese Patent No. 4935646 is considered to have difficulty in securing deployment stability when the knee airbag is deployed. Specifically, it can be considered that in deployment of the knee airbag, the deployment pressure is exerted on a glove box and a posture of the glove box is changed. Thus, as for the knee airbag which is deployed from a lower portion of the glove box, its deployment direction or the like becomes unstable by being involved by the glove box.

In a case where the deployment stability of the knee airbag cannot be secured as described above, it becomes difficult to appropriately protect a knee of an occupant.

The present disclosure has been made to solve the above problems, and provides a vehicle that can secure deployment stability of a knee airbag while intending to achieve compact formation and an improvement in flexibility of layout design by disposing the knee airbag in a lower portion of a storage box.

A vehicle according to one aspect of the present disclosure is a vehicle which includes a knee airbag arranged in front of a passenger seat and which includes: a storage box; a vehicle-body fixation portion; and the knee airbag. The storage box is provided in a front portion of the passenger seat in an instrument panel extending in a vehicle width direction and which has a housing demarcating a storage space. The vehicle-body fixation portion is fixed to a vehicle body and is arranged above the housing. The knee airbag is fixed to a lower portion of the housing and is capable of being deployed rearward and downward.

In the vehicle according to this aspect, the housing has a ceiling wall which covers a portion above the storage space and a plurality of support portions which are supported by the instrument panel. Furthermore, the ceiling wall has a bulge portion which bulges upward compared to another portion of the ceiling wall and is spaced apart from the vehicle-body fixation portion by a distance such that the bulge portion abuts the vehicle-body fixation portion when the knee airbag is deployed.

In the vehicle according to the above aspect, because the knee airbag is fixed to the lower portion of the storage box, it is possible to make compact a periphery of the knee airbag compared to a case where the knee airbag is provided to be spaced apart from the storage box. Further, high flexibility of layout design of the periphery of the knee airbag can be secured.

In a structure in which the knee airbag is fixed to the lower portion of the storage box, a reaction force is applied to the storage box due to a deployment pressure of the knee airbag in deployment of the knee airbag, and a posture of the storage box is likely to be changed. On the other hand, in the vehicle according to the above aspect, because the ceiling wall in the housing has the bulge portion, the bulge portion abuts the vehicle-body fixation portion in deployment of the knee airbag, and a further posture change of the storage box is inhibited.

That is, in the vehicle according to the above aspect, the bulge portion provided for the ceiling wall in the housing functions as a displacement regulation portion which regulates displacement of the storage box in deployment of the knee airbag. Thus, in the vehicle according to the above aspect, while a configuration is employed in which the knee airbag is fixed to the lower portion of the storage box, the posture change of the storage box is inhibited in deployment of the knee airbag, and deployment stability of the knee airbag can be secured.

In the vehicle according to the above aspect, the bulge portion may be formed so as to be positioned on a front side relative to the vehicle-body fixation portion.

In the vehicle according to the above aspect, because the bulge portion is formed so as to be positioned on the front side of the vehicle-body fixation portion, rearward displacement of the storage box in deployment of the knee airbag is regulated. Accordingly, in the vehicle according to the above aspect, displacement of the storage box, which serves as a starting point of the deployment, to an occupant side is regulated in deployment of the knee airbag, and the deployment stability of the knee airbag can be secured.

In the vehicle according to the above aspect, at least a part of the support portions among the plurality of support portions may be arranged on an upper side and on a rear side of the knee airbag.

In the vehicle according to the above aspect, because at least a part of the support portions in the housing are arranged on the upper side and the rear side of the knee airbag, in a case where an upward reaction force is applied to the storage box in deployment of the knee airbag, the housing is likely to rotate around the above part of the support portions as the pivot, and the ceiling wall is likely to be displaced rearward. On the other hand, in the vehicle according to the above aspect, because the bulge portion is formed so as to be positioned on the front side of the vehicle-body fixation portion, rearward displacement of the ceiling wall is regulated. Thus, in the vehicle according to the above aspect, in deployment of the knee airbag, the posture change of the storage box is inhibited, and this is advantageous in securing the deployment stability of the knee airbag.

In the vehicle according to the above aspect, the bulge portion may be arranged in a position spaced apart from the vehicle-body fixation portion in a state where the knee airbag is not yet deployed and may regulate further displacement of the housing by a reaction force from the vehicle-body fixation portion in a state where the bulge portion abuts the vehicle-body fixation portion due to displacement of the housing, the displacement accompanying deployment of the knee airbag.

In the vehicle according to the above aspect, because in a state where the knee airbag is not yet deployed, the bulge portion is arranged to be spaced apart from the vehicle-body fixation portion, production of noise due to mutual contact between those due to traveling of the vehicle can be inhibited.

Note that in a state where the knee airbag is not yet deployed, by joining the bulge portion to the vehicle-body fixation portion so as not to rattle, production of noise in the traveling can also be inhibited; however, in this case, a member is needed which is related to joining between the bulge portion and the vehicle-body fixation portion, and a rise in manufacturing costs is caused.

In the vehicle according to the above aspect, the knee airbag may have an airbag main body as a bag body, an inflator which is capable of supplying gas to an internal portion of the airbag main body, and an airbag lid, which covers a portion below the airbag main body and a rear portion of which opens when the airbag main body expands.

In the vehicle according to the above aspect, a configuration is employed in which the knee airbag has the airbag lid whose rear portion opens in expansion of the airbag main body, the airbag main body can be deployed toward the passenger side (rear side), and this is advantageous in intending to certainly protect an occupant.

In the vehicle according to the above aspect, the airbag main body may be arranged on an upper side of the airbag lid and on a rear side of the inflator.

In the vehicle according to the above aspect, because the airbag main body is arranged on the rear side (occupant side) of the inflator, when the airbag main body expands and is deployed, the deployment is not hindered by the inflator, and this is advantageous in intending to certainly protect the occupant.

In the vehicle according to the above aspect, a side wall of the housing may have a reinforcement portion which is formed to extend from a lower end portion toward an upper end portion and which reinforces rigidity of the side wall. In the vehicle according to the above aspect, because the side wall of the housing has the reinforcement portion, even in a case where a reaction force is applied in deployment of the knee airbag, the side wall of the housing can be inhibited from being deformed or damaged. Thus, the vehicle according to the above aspect is further advantageous in securing the deployment stability of the knee airbag.

The vehicle according to each of the above aspects can secure deployment stability of the knee airbag while intending to achieve compact formation and an improvement in flexibility of layout design by disposing the knee airbag in a lower portion of the storage box.

DETAILED DESCRIPTION

Embodiments will hereinafter be described with reference to the drawings. Note that forms described in the following represent the present disclosure as examples, and the present disclosure is not at all limited by the following forms except inherent configurations thereof.

First Embodiment

1. Arrangement Form of Glove Box 11

A description will be made by using FIG. 1 about an arrangement form of a glove box 11 in a vehicle 1 according to a first embodiment.

Figure 1:
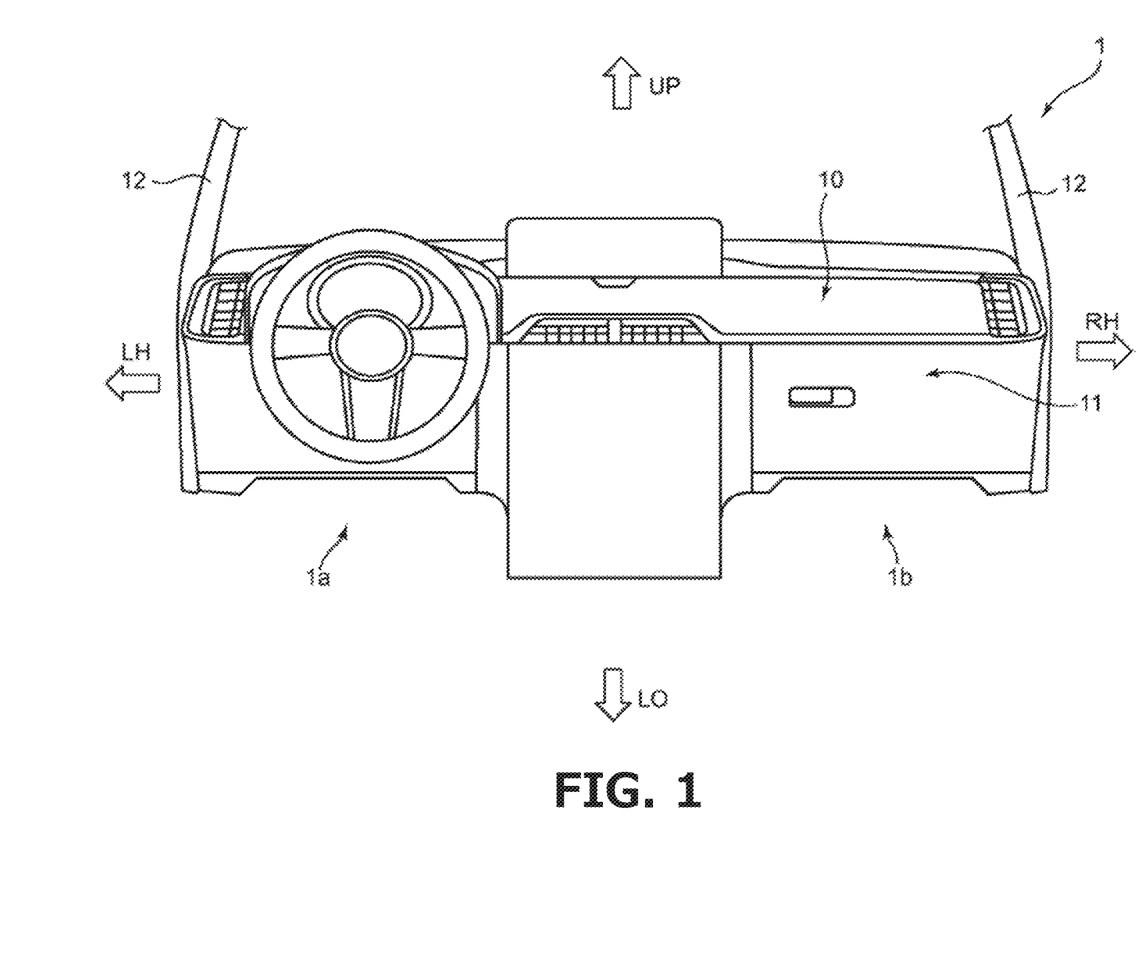
FIG. 1 is a schematic diagram in which front is seen from an inside of a vehicle cabin in a vehicle according to a first embodiment.

As illustrated in FIG. 1, in the vehicle 1 and in a front portion of a vehicle cabin, an instrument panel 10 is provided to extend in a vehicle width direction from a driver seat side portion 1*a* to a passenger seat side portion 1*b*. The instrument panel 10 includes the glove box (storage box) 11 in the passenger seat side portion 1*b*.

2. Knee Airbag 113 of Passenger Seat Side Portion 1*b*

A description will be made by using FIG. 2 about a configuration of a knee airbag 11 disposed in the passenger seat side portion 1*b* in the vehicle 1.

Figure 2:
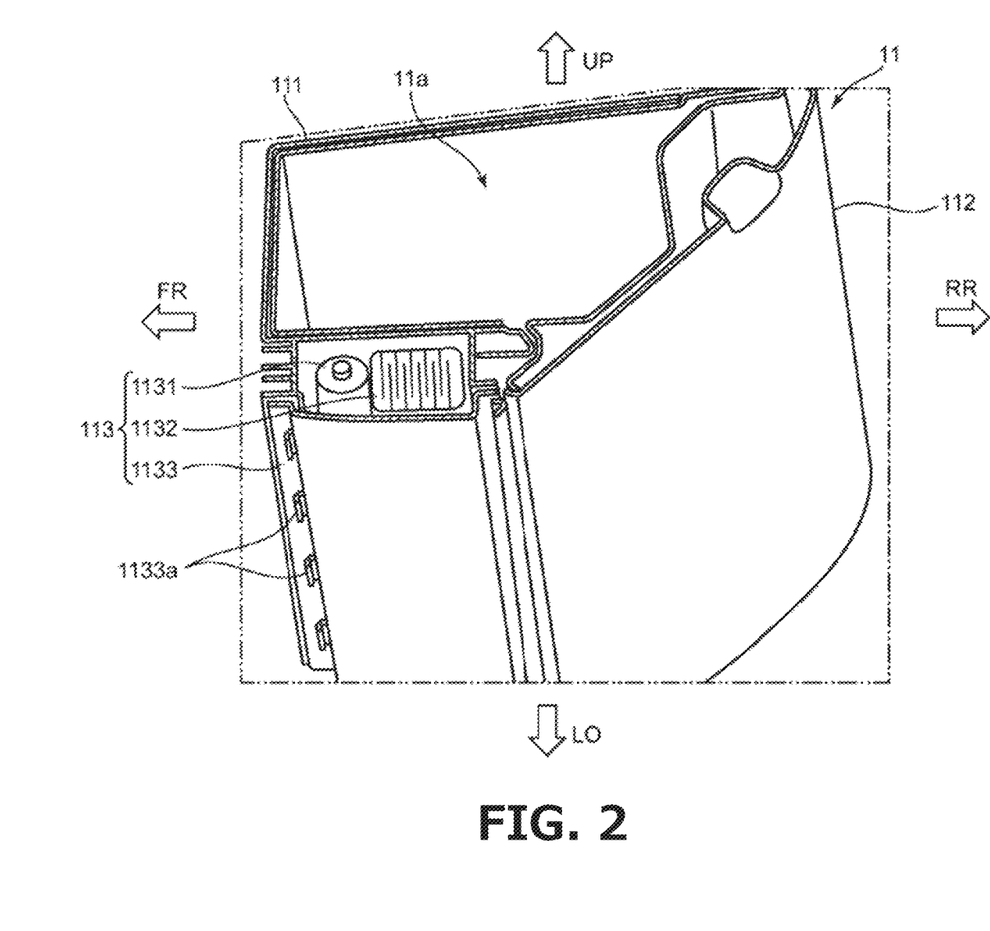
FIG. 2 is a cross-sectional view illustrating a configuration of a glove box.

As illustrated in FIG. 2, a knee airbag 113 is fixed to a lower portion of a housing 111 in the glove box 11. The housing 111 demarcates a storage space 11*a* of the glove box 11 and has an opening through which a baggage is capable of being put in and out on a rear side (occupant side). Furthermore, a box lid 112 which is capable of being opened and closed is mounted on the opening of the housing 111.

The storage space 11*a* demarcated by the housing 111 is formed such that its front-rear length becomes longer toward an upper portion and its front-rear length becomes shorter toward a lower portion. Thus, the box lid 112 is arranged such that its further upper portion is positioned further on a rear side and its further lower portion is positioned further on a front side.

The knee airbag 113 is fixed to the lower portion of the housing 111. The knee airbag 113 protects a knee of an occupant who is seated on a passenger seat in a collision of the vehicle 1. The knee airbag 113 has an inflator 1131 which emits gas in the collision of the vehicle 1, an airbag main body 1132 which expands and is deployed by the gas emitted from the inflator 1131, and an airbag lid 1133 which covers a portion below of the inflator 1131 and the airbag main body 1132.

Here, the airbag main body 1132, together with the inflator 1131, is arranged on the rear side of the inflator 1132 in a position above the airbag lid 1133. Note that although details are not illustrated, a hinge related to opening and closing of the box lid 112 is arranged on the further rear side relative to the airbag main body 1132.

In the collision of the vehicle 1, the airbag main body 1132 as a bag body is filled with the gas from the inflator 1131, and a rear side of the airbag lid 1133 opens by an expansion pressure of the airbag main body 1132 while using, as pivots, lid hinges 1133a on the front side.

3. External Appearance Configuration of Housing 111

Figure 3:
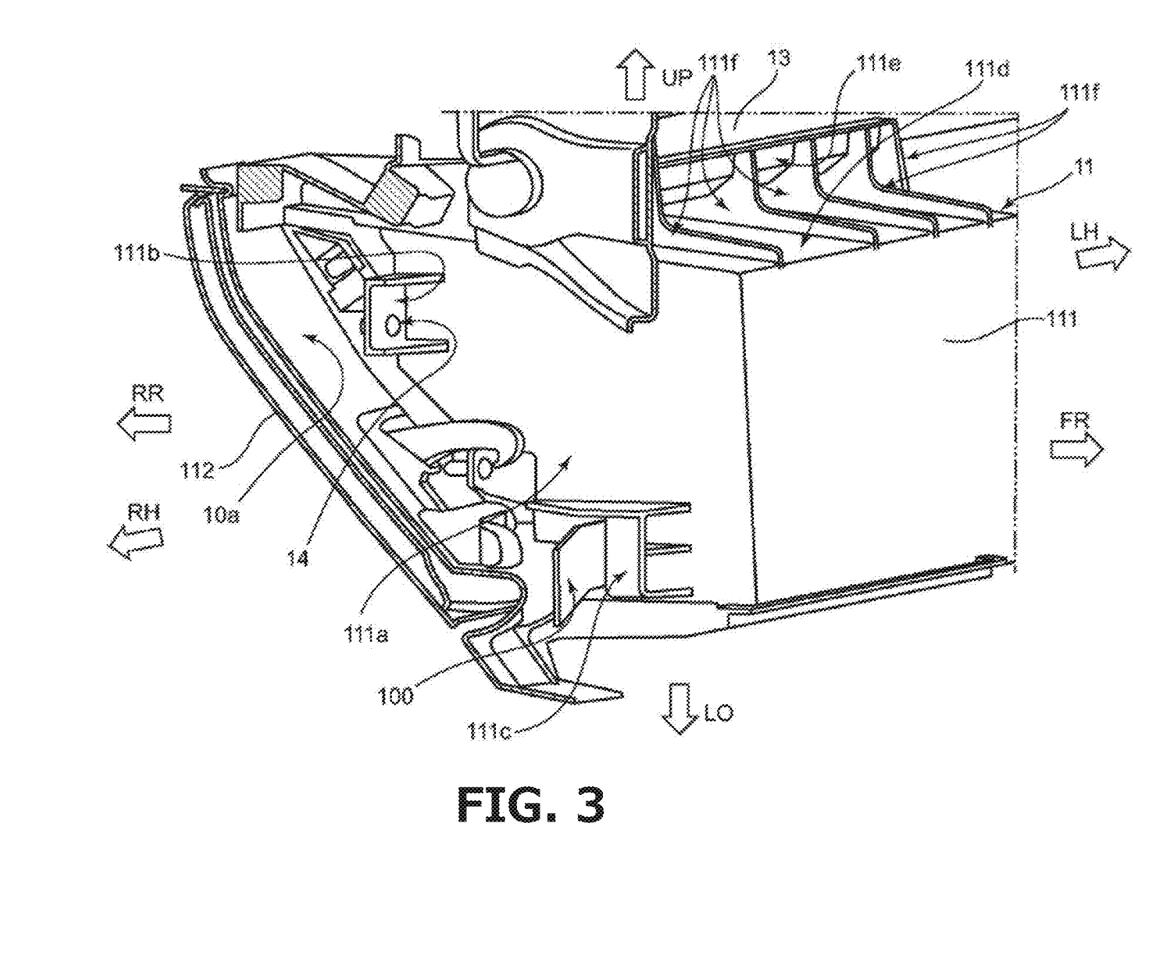
FIG. 3 is a perspective view illustrating an external appearance configuration of the glove box.

A description will be made by using FIG. 3 and FIG. 4 about an external appearance configuration of the housing 111 in the glove box 11. FIG. 3 is a perspective view illustrating the glove box 11 and its peripheral configuration as seen from obliquely right front, and FIG. 4 is a perspective view illustrating the glove box 11 and its peripheral configuration as seen from obliquely left front.

Figure 4:
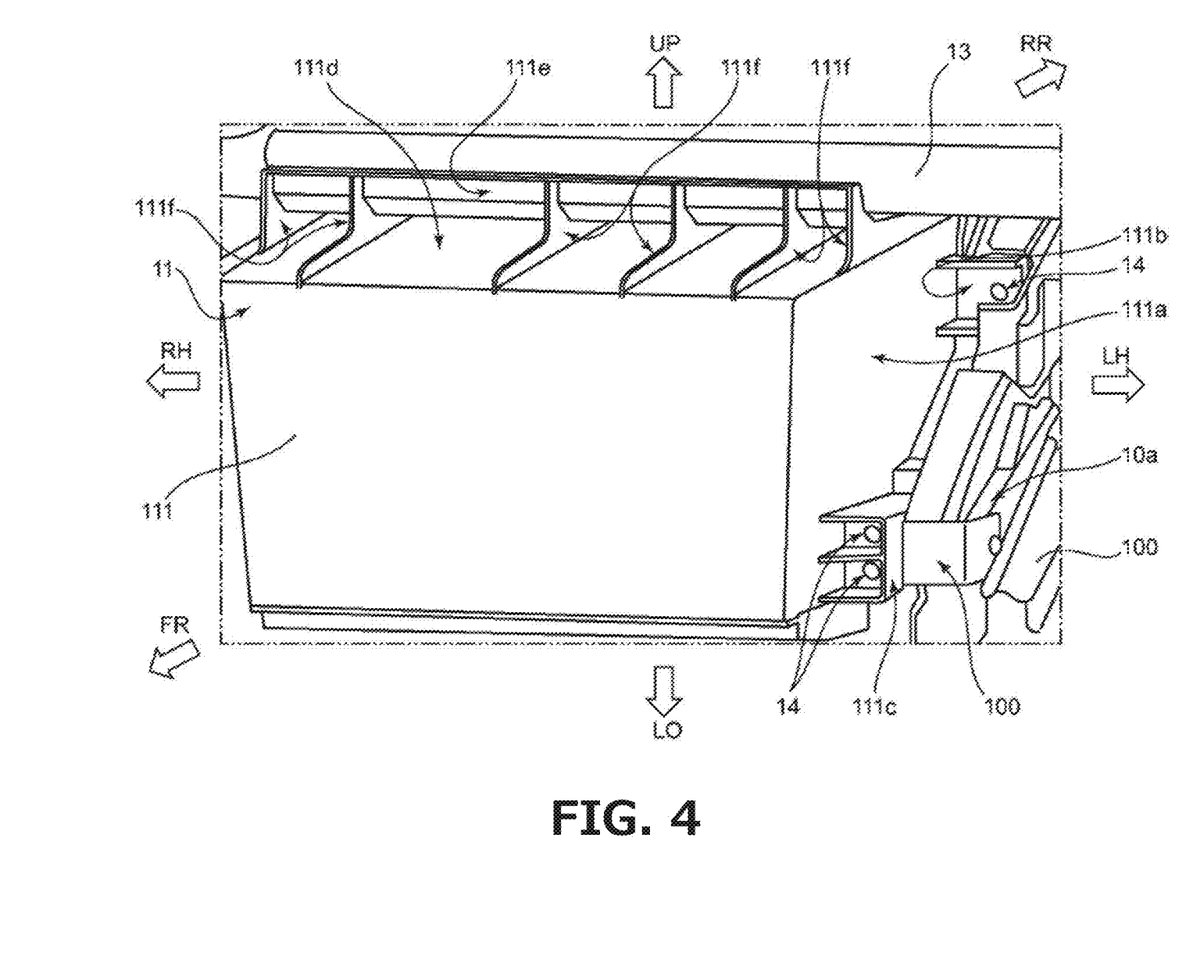
FIG. 4 is a perspective view illustrating the external appearance configuration of the glove box.

As illustrated in FIG. 3 and FIG. 4, in each of both of left and right side walls 111a of the housing 111, two support portions 111b (support portions on a vehicle rear side) and 111c (support portions on a vehicle front side) are formed. Each of the support portions 111b and 111c is formed to extend toward an outside in a left-right direction. In the support portions 111b and 111c provided to the side walls 111a of the housing 111, the glove box 11 is supported by a back face (a surface on the front side) 10a of the instrument panel 10 by using fastening members (such as bolts or rivets) 14.

Note that with respect to the support portion 111c, the glove box 11 is supported by the back face 10a of the instrument panel 10 via a bracket 100.

Here, in the present embodiment, in each of the left and right side walls 111a, the support portion 111b is arranged on an upper side and the rear side of the support portion 111c.

Note that in the present embodiment, those support portions 111b and 111c are supported by the instrument panel 10 but may be supported by a vehicle-body structure around the instrument panel 10, or one support portion of the support portions 111b and 111c may be supported by a vehicle-body structure around the instrument panel 10.

Above a ceiling wall 111d in the housing 111, an instrument panel member (vehicle-body fixation portion) 13 extending in the left-right direction is arranged. The instrument panel member 13 is a member which supports the instrument panel 10 and so forth.

The ceiling wall 111d of the housing 111 has fin-shaped displacement regulation ribs 111f, which are formed to protrude upward in a state where the displacement regulation ribs 111f are mutually at distances in the left-right direction, and a displacement regulation wall portion 111e which is integrally formed with the displacement regulation ribs 111f and has a plate shape extending in the left-right direction. Although functions of the displacement regulation wall portion 111e and the displacement regulation ribs 111f will be described later, the displacement regulation wall portion 111e and the displacement regulation ribs 111f of the present embodiment correspond to a bulge portion.

As illustrated in FIG. 3 and FIG. 4, the displacement regulation wall portion 111e is disposed to be positioned on the front side of the instrument panel member 13 at a distance from the instrument panel member 13.

4. Disposition Configuration of Instrument Panel Member 13

A disposition configuration of the instrument panel member 13 will be described by using FIG. 5.

Figure 5:
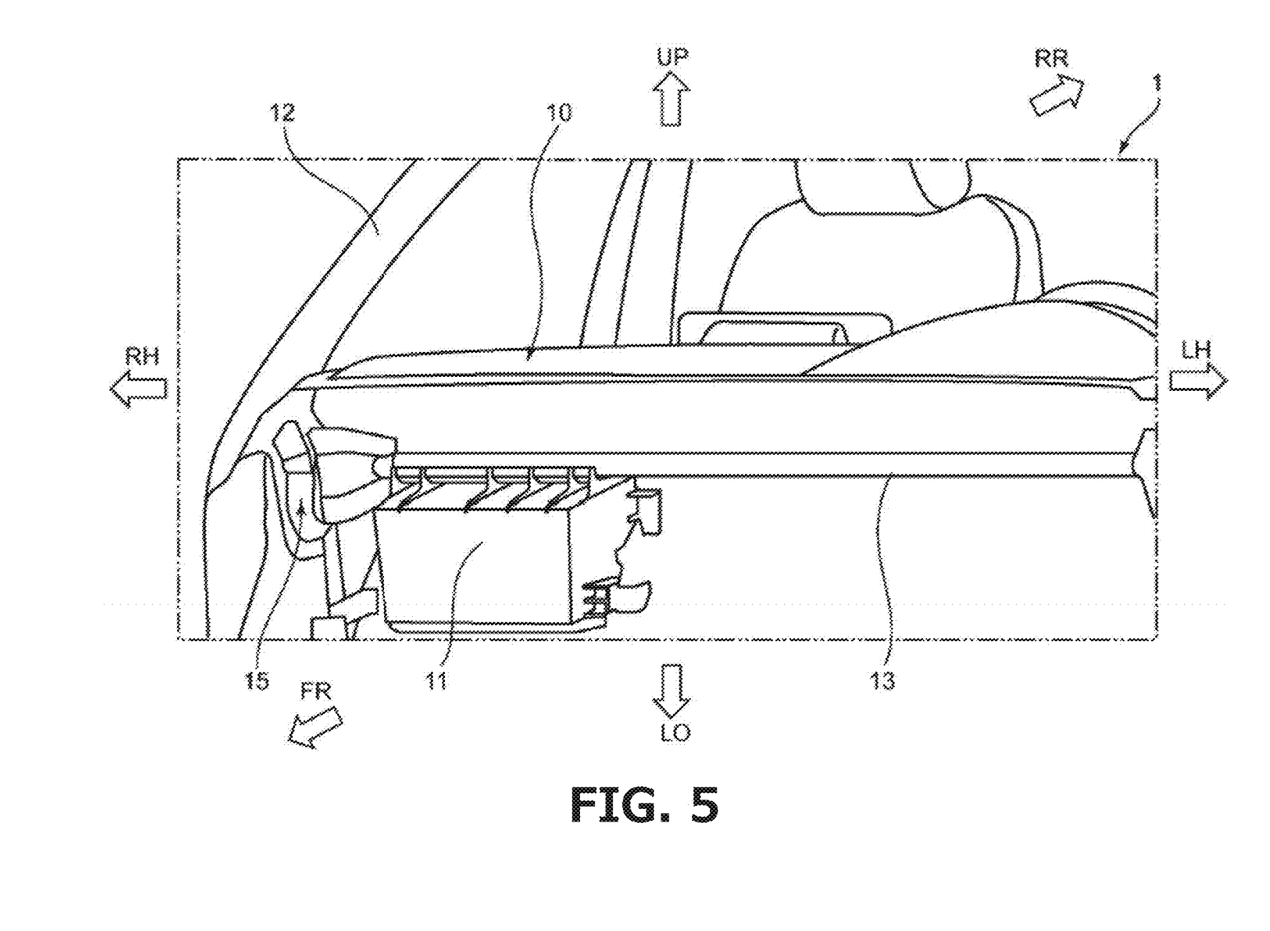
FIG. 5 is a perspective view illustrating a securing structure of an instrument panel member to a vehicle body.

As illustrated in FIG. 5, the instrument panel member 13 is a rod-shaped member extending in the left-right direction (vehicle width direction). The instrument panel 10 is mounted on the instrument panel member 13.

At both of left and right end portions, the instrument panel member 13 is respectively fixed to a vehicle body 15 below front pillars 12. Note that although FIG. 5 does not illustrate a left-side end of the instrument panel member 13, similarly to a right side, an end portion on a left side is fixed to the vehicle body 15 below the front pillar 12.

5. Positional Relationship between Instrument Panel Member 13 and Housing 111

A description will be made by using FIG. 6 about a positional relationship between the instrument panel member 13 and the housing 111 in an ordinary condition (a state where the vehicle 1 is not undergoing a collision).

Figure 6:
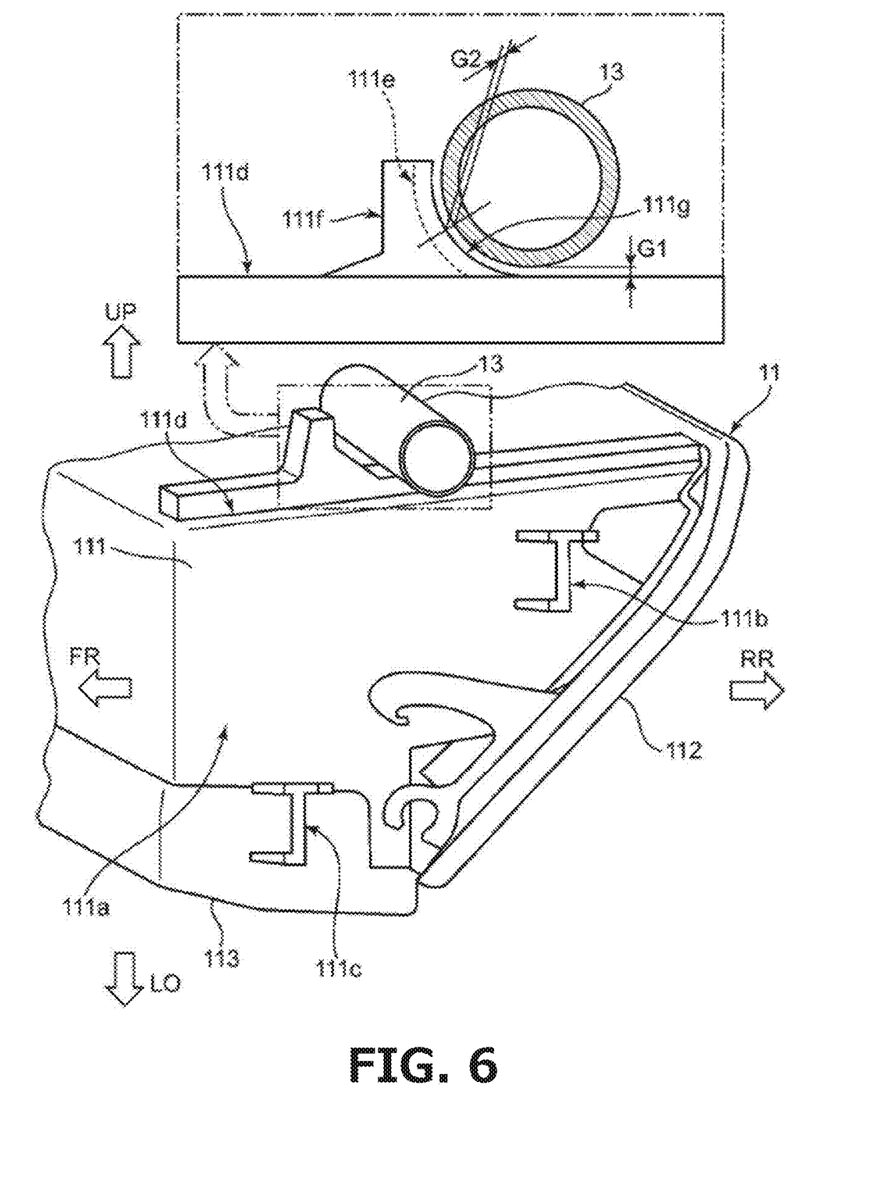
FIG. 6 is a side view illustrating a positional relationship of a displacement regulation wall portion with the instrument panel member.

As illustrated in FIG. 6, an upper surface of the ceiling wall 111d of the housing 111 is arranged at a distance G1 so as not to directly abut the instrument panel member 13 in the ordinary condition. An opposed surface (a surface opposed to the instrument panel member 13) 111g of the displacement regulation wall portion 111e is also arranged at a distance G2 so as not to directly abut the instrument panel member 13 in the ordinary condition.

Here, the distances G1 and G2 are set to distances at which the instrument panel member 13 does not abut the ceiling wall 111d or the displacement regulation wall portion 111e due to vibration produced by traveling of the vehicle 1 in the ordinary state. Accordingly, during the traveling of the vehicle 1 in the ordinary state, abutting between the instrument panel member 13 and the ceiling wall 111d or the displacement regulation wall portion 111e is inhibited, and production of a collision sound can be inhibited.

Note that the ceiling wall 111d and the displacement regulation wall portion 111e are fixed to the instrument panel member 13, and production of the collision sound during traveling can thereby be inhibited. However, in this case, it can be considered that a member is needed which fixes the ceiling wall 111d and the displacement regulation wall portion 111e to the instrument panel member 13 and this leads to a rise in manufacturing costs. Thus, as the present embodiment, it is desirable that a point stripe wall 111d and the displacement regulation wall portion 111e be spaced apart from the instrument panel member 13 by the distances G1 and G2.

As illustrated in FIG. 6, the support portion 111b of the two support portions 111b and 111c provided in each of the side walls 111a is arranged on the rear side of the instrument panel member 13 and the support portion 111c and is arranged on the upper side of the support portion 111c.

6. Functions of Displacement Regulation Wall Portion 111e and so Forth in Deployment of Knee Airbag 113

A description will be made by using FIG. 7 about functions of the displacement regulation wall portion 111e and the displacement regulation ribs 111f in deployment of the knee airbag 113.

Figure 7:
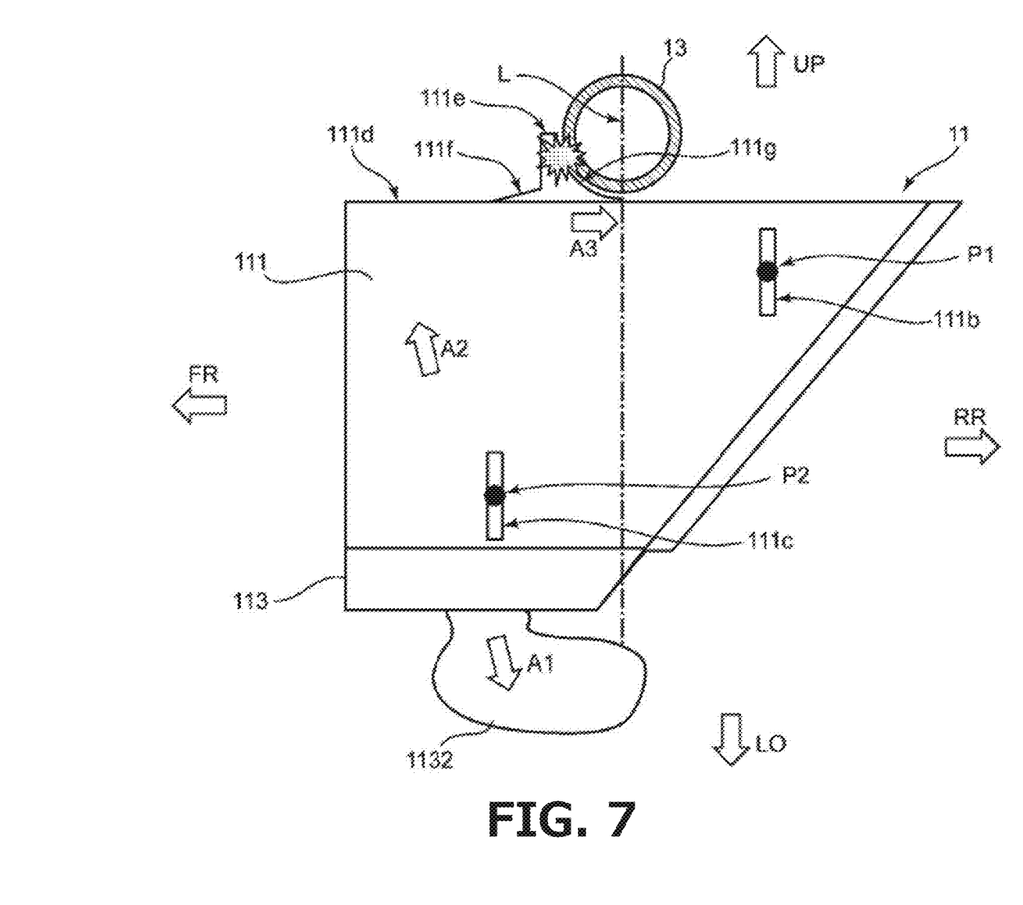
FIG. 7 is a schematic diagram illustrating a role played by the displacement regulation wall portion in deployment of a knee airbag.

As illustrated in FIG. 7, in the collision of the vehicle 1, the airbag main body 1132 of the knee airbag 113 expands and is deployed obliquely rearward and downward (arrow A1). Due to expansion and deployment of the airbag main body 1132, a reaction force indicated by an arrow A2 acts on the housing 111 of the glove box 11. That is, the reaction force to lift upward a front portion of the housing 111 is exerted.

In a view in the vehicle width direction, as for a shape of the housing, because a bottom portion of the housing in which the knee airbag 113 is arranged is shorter than the ceiling wall 111d and is positioned to be deviated to the vehicle front side and the box lid has a generally trapezoidal shape which is inclined so as to be positioned further on the rear side toward a vehicle upper side, arrangement of the knee airbag is positioned to be deviated to a position below the housing and on the vehicle front side of the housing.

Thus, in a case where the reaction force indicated by the arrow A2 is exerted, the housing 111 is likely to rotate around, as a center, a rear half of the housing.

In addition, in a case where a perpendicular line L is drawn which passes through a center of a diameter of the instrument panel member 13, the support portion 111b is positioned in the rear of the perpendicular line L, and the support portion 111c is positioned in front of the perpendicular line L. Furthermore, as illustrated in FIG. 3 and FIG. 4, the support portion 111b is directly supported by the instrument panel 10, but the support portion 111c is supported by the instrument panel 10 via the bracket 100. Thus, in a case where the reaction force indicated by the arrow A2 is exerted, the housing 111 is likely to rotate around, as a center, a support part P1 of the support portion 111b. That is, a support part P2 of the support portion 111c is present directly above the knee airbag 113 and thus only becomes a part to which the reaction force is input; however, because the support part P1 is arranged in a position spaced apart from the knee airbag 113, due to exertion of the reaction force A2, the housing 111 is likely to rotate such that its front portion is lifted up around, as the center, the support part P1.

In particular, such a motion becomes significant in a case where the housing is formed of resin.

In a case where the housing 111 is likely to rotate as described above, a front portion of the ceiling wall 111d of the housing 111, the front portion being positioned in front of the support part P1, is likely to be displaced rearward as an arrow A3.

However, because the displacement regulation wall portion 111e is provided for the ceiling wall 111d of the housing 111, at a time point when the distance G2 illustrated in FIG. 6 is lost (at a time point when the distance G2 becomes "0"), the opposed surface 111g of the displacement regulation wall portion 111e abuts the instrument panel member 13. Accordingly, a reaction force due to abutting with the instrument panel member 13 is transmitted from the displacement regulation wall portion 111e to the whole housing 111 via the displacement regulation ribs 111f. Thus, when the airbag main body 1132 expands and is deployed, a posture of the housing 111 of the glove box 11 is prevented from being largely changed. Accordingly, a posture change of the housing 111 serving as a reference for the expansion and deployment of the airbag main body 1132 is inhibited, and deployment stability of the knee airbag 113 is secured.

7. Effects

In the vehicle 1 according to the present embodiment, because the knee airbag 113 is fixed to the lower portion of the housing 111 in the glove box 11, it is possible to make compact a periphery of the knee airbag 113 compared to a case where the knee airbag 113 is provided to be spaced apart from the glove box 11. Further, high flexibility of layout design of the periphery of the knee airbag 113 can be secured.

Further, in a structure in which the knee airbag 113 is fixed to the lower portion of the housing 111 in the glove box 11, a reaction force is applied to the housing 111 due to a deployment pressure of the knee airbag 113 in deployment of the knee airbag 113, and the posture of the housing 111 is thereby likely to be changed. On the other hand, in the vehicle 1 according to the present embodiment, because the ceiling wall 111d in the housing 111 has the displacement regulation wall portion 111e and the displacement regulation ribs 111f, the displacement regulation wall portion 111e and so forth abut the instrument panel member 13 in deployment of the knee airbag 113, and a further posture change of the housing 111 is thereby inhibited. That is, in the vehicle 1, the displacement regulation wall portion 111e and so forth provided for the ceiling wall 111d of the housing 111 regulate displacement of the housing 111 in deployment of the knee airbag 113. Thus, in the vehicle 1, while a configuration is employed in which the knee airbag 113 is fixed to the lower portion of the housing 111 in the glove box 11, the posture change of the housing 111 is inhibited in deployment of the knee airbag 113, and the deployment stability of the knee airbag 113 can be secured.

Further, in the vehicle 1 according to the present embodiment, because the displacement regulation wall portion 111e is formed to be positioned on the front side of the instrument panel member 13, rearward displacement of the housing 111 is regulated in deployment of the knee airbag 113. Accordingly, in the vehicle 1, displacement of the housing, which serves as a starting point of the deployment, to the rear side (occupant side) is regulated in deployment of the knee airbag 113, and the deployment stability of the knee airbag 113 can be secured.

Further, in the vehicle 1 according to the present embodiment, because the support portion 111b of the plurality of support portions 111b and 111c in the housing 111 is arranged on the upper side and the rear side of the knee airbag 113, in a case where an upward reaction force is applied to the housing 111 in deployment of the knee airbag 113, the housing 111 is likely to rotate around the support portion 111b as the pivot, and the ceiling wall 111d is likely to be displaced rearward. On the other hand, in the vehicle 1, because the displacement regulation wall portion 111e is formed to be positioned on the front side of the instrument panel member 13, displacement of the ceiling wall 111d to the rear side is regulated. Thus, in the vehicle 1, in deployment of the knee airbag 113, the posture change of the housing 111 of the glove box 11 is inhibited, and this is advantageous in securing the deployment stability of the knee airbag 113.

Further, in the vehicle 1 according to the present embodiment, because in a state where the knee airbag 11 is not yet deployed, the displacement regulation wall portion 111d is arranged to be spaced apart from the instrument panel member 13, production of noise due to mutual contact between those due to the traveling of the vehicle 1 can be inhibited.

Further, in the vehicle 1 according to the present embodiment, a configuration is employed in which the knee airbag 113 has the airbag lid 1133 whose rear portion opens in expansion of the airbag main body 1132, the airbag main body 1132 can thereby be deployed toward the passenger side (rear side), and this is advantageous in intending to certainly protect the occupant.

Further, in the vehicle 1 according to the present embodiment, because the airbag main body 1132 is arranged on the rear side (occupant side) of the inflator 1131, when the airbag main body 1132 expands and is deployed, the deployment is not hindered by the inflator 1131, and this is advantageous in intending to certainly protect the occupant.

As described above, the vehicle 1 according to the present embodiment can secure the deployment stability of the knee airbag 113 while intending achievement of compact formation and an improvement in flexibility of layout design by disposing the knee airbag 113 in the lower portion of the housing 111 in the glove box 11.

Second Embodiment

Figure 8:
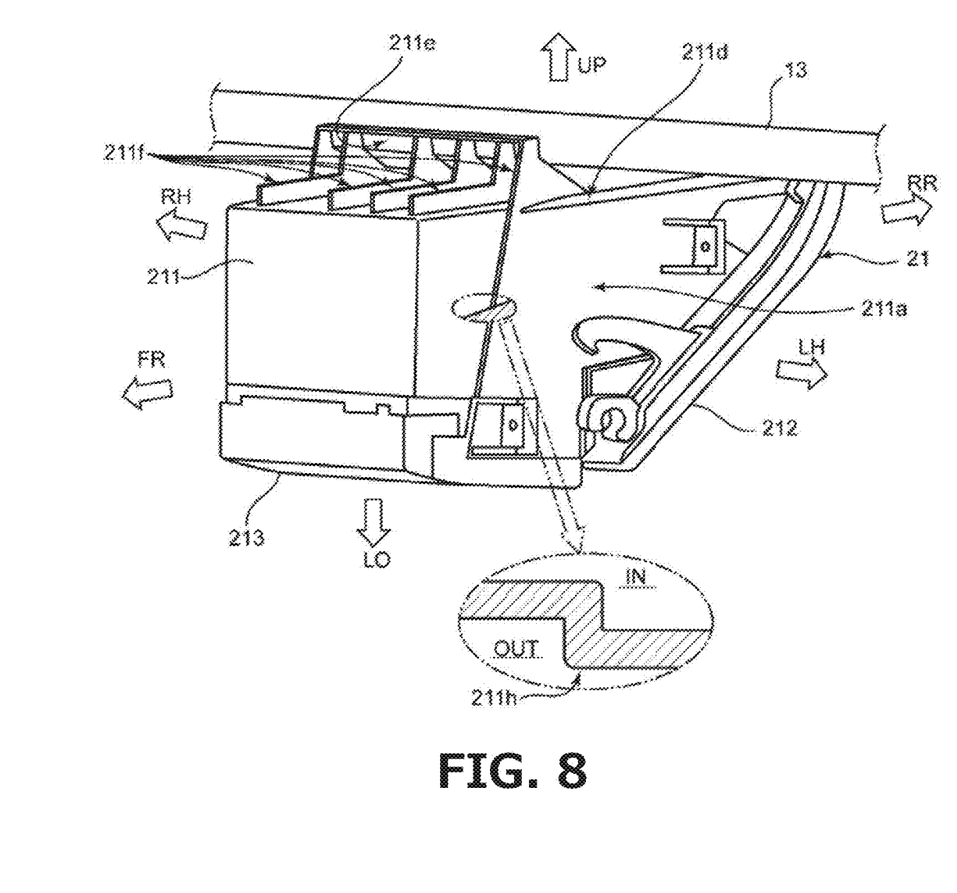
FIG. 8 is a perspective view illustrating a configuration of a glove box in a vehicle according to a second embodiment.

A vehicle according to a second embodiment will be described by using FIG. 8. Note that FIG. 8 illustrates a glove box 21 and the instrument panel member 13 by extracting only those. For parts which are not illustrated, the same configurations as those in the above first embodiment are employed.

As illustrated in FIG. 8, the glove box 21 has a housing 211 which demarcates a storage space and a box lid 212 which is capable of opening and closing an opening in the housing 211 on the rear side. Furthermore, a knee airbag 213 is fixed to a lower portion of the housing 211. A configuration of the knee airbag 213 is the same as that of the knee airbag 113 of the above first embodiment.

Further, a ceiling wall 211d of the housing 211 has fin-shaped displacement regulation ribs 211f, which are formed to protrude upward in a state where the displacement regulation ribs 211f are mutually at distances in the left-right direction, and a displacement regulation wall portion 211e which is integrally formed with the displacement regulation ribs 211f and has a plate shape extending in the left-right direction. The displacement regulation wall portion 211e and the displacement regulation ribs 211f of the present embodiment also correspond to the bulge portion.

In each of side walls 211a on both of left and right sides in the housing 211, a step portion (reinforcement portion) 211h is provided to linearly extend from a position, to which the knee airbag 213 is fixed, toward a position, in which the displacement regulation ribs 211f stand up. As illustrated in an enlarged cross-sectional part in FIG. 8, the step portion 211h connects together end portions of wall portions which are arranged while having a deviation in the left-right direction in front and rear of the step portion 211h. The side wall 211a is provided with the step portion 211h linearly extending from the position, to which the knee airbag 213 is fixed, toward the position, in which the displacement regulation ribs 211f stand up, and rigidity of the side wall 211a can thereby be reinforced compared to a case where the step portion is not provided.

Because the vehicle according to the present embodiment is the same as the vehicle of the above first embodiment except the point that the step portion 211h is provided in the side wall 211a of the housing 211, the same effects as those of the above first embodiment can be obtained.

Further, in the vehicle according to the present embodiment, because the reinforcement portion 211h is formed in the side wall 211a of the housing 211, even in a case where a reaction force is applied in deployment of the knee airbag 213, the side wall 211a of the housing 211 can be inhibited from being deformed or damaged. Thus, the vehicle according to the present embodiment is further advantageous in securing the deployment stability of the knee airbag 213.

Third Embodiment

Figure 9A:
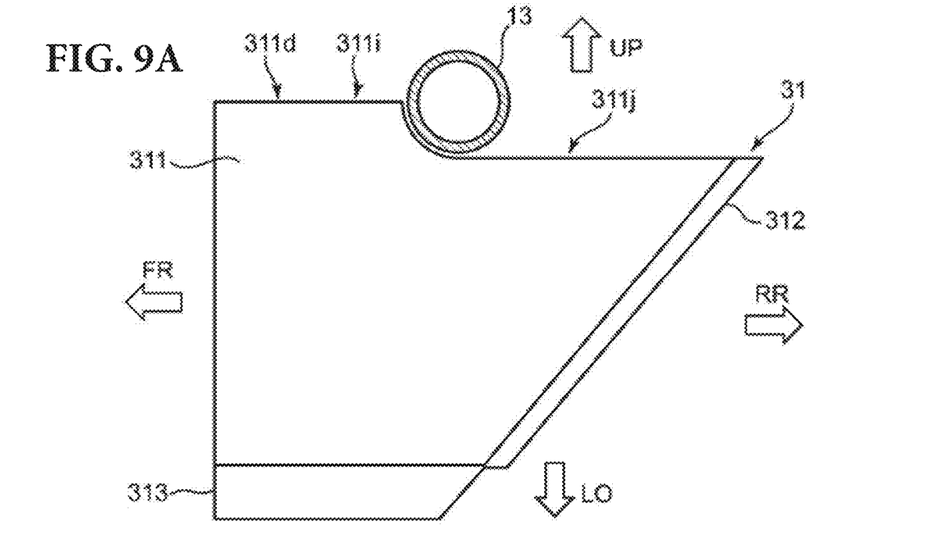
FIG. 9A is a schematic diagram illustrating a configuration of a glove box in a vehicle according to a third embodiment.

A vehicle according to a third embodiment will be described by using FIG. 9A. Note that FIG. 9A illustrates a glove box 31 by extracting only that. For parts which are not illustrated, the same configurations as those in the above first embodiment or the above second embodiment are employed.

As illustrated in FIG. 9A, the glove box 31 has a housing 311 which demarcates a storage space and a box lid 312 which is capable of opening and closing an opening in the housing 311 on the rear side. Furthermore, a knee airbag 313 is fixed to a lower portion of the housing 311. A configuration of the knee airbag 313 is the same as that of the knee airbag 113 of the above first embodiment or the knee airbag 213 of the above second embodiment.

A ceiling wall 311d of the housing 311 has a high ceiling portion 311i in which a portion on the front side of the instrument panel member 13 bulges upward. The ceiling wall 311d is configured with the high ceiling portion 311i and a low ceiling portion 311j which is continuous with the high ceiling portion 311i and extends to the rear side of the instrument panel member 13.

Note that in the ceiling wall 311d of the housing 311, the high ceiling portion 311i corresponds to the bulge portion.

The ceiling wall 311d of the housing 311 is disposed such that both of the high ceiling portion 311i and the low ceiling portion 311j have distances from the instrument panel member 13 in a case where the vehicle is in the ordinary state. The distances from the instrument panel member 13 are the same as the distances G1 and G2 in the above first embodiment.

In the vehicle according to the present embodiment, the ceiling wall 311d of the housing 311 has the high ceiling portion 311i in a front portion, and the high ceiling portion 311i functions as the bulge portion. That is, even when the vehicle according to the present embodiment undergoes a collision and the housing 311 is likely to be displaced to the rear side, the high ceiling portion 311i abuts the instrument panel member 13, and displacement of the housing 311 is thereby regulated. Thus, similarly to the above first embodiment and the above second embodiment, the vehicle according to the present embodiment can secure the deployment stability of the knee airbag 313.

Further, in the vehicle according to the present embodiment, because the front portion of the ceiling wall 311d of the housing 311 in the glove box 31 is set as the high ceiling portion 311i which bulges upward, a volume of the storage space of the glove box 31 can be secured largely.

Fourth Embodiment

Figure 9B:
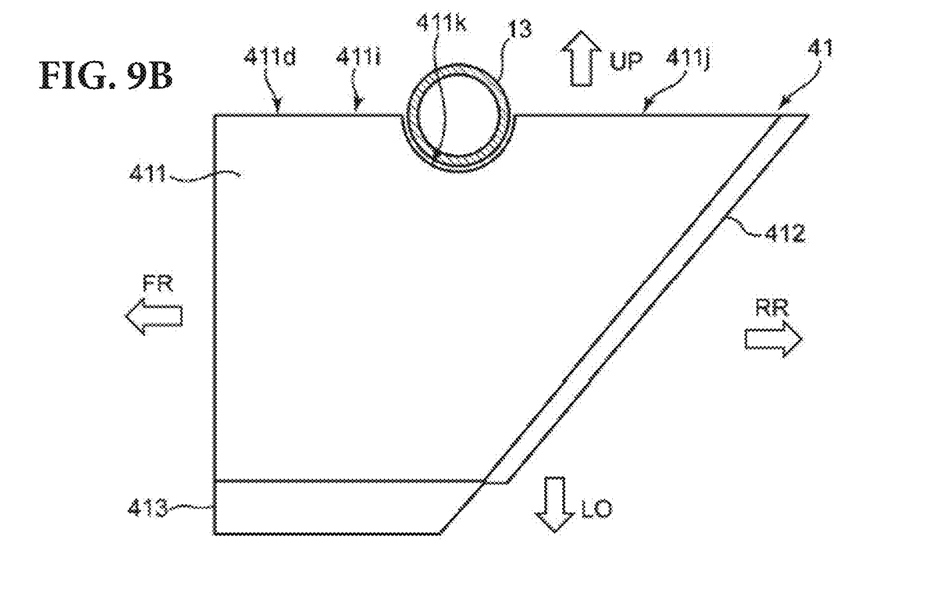
FIG. 9B is a schematic diagram illustrating a configuration of a glove box in a vehicle according to a fourth embodiment.

A vehicle according to a fourth embodiment will be described by using FIG. 9B. Note that FIG. 9B illustrates a glove box 41 by extracting only that. For parts which are not illustrated, the same configurations as those in the above first embodiment to the above third embodiment are employed.

As illustrated in FIG. 9B, the glove box 41 has a housing 411 which demarcates a storage space and a box lid 412 which is capable of opening and closing an opening in the housing 411 on the rear side. Furthermore, a knee airbag 413 is fixed to a lower portion of the housing 411. A configuration of the knee airbag 413 is the same as that of the knee airbag 113 or the like of the above first embodiment.

Similarly to the above third embodiment, a ceiling wall 411d of the housing 411 has a front high ceiling portion 411i in which a portion on the front side of the instrument panel member 13 bulges upward. In addition, the housing 411 of the present embodiment has a rear high ceiling portion 411j in which a portion in the ceiling wall 411d on the rear side of the instrument panel member 13 bulges upward. Between the front high ceiling portion 411i and the rear high ceiling portion 411j, a recessed portion 411k is provided which is recessed so as to avoid the instrument panel member 13 and so as to have a lower height than those of the front high ceiling portion 411i and the rear high ceiling portion 411j.

The ceiling wall 411d of the housing 411 is configured such that the high ceiling portions 411i and 411j and the recessed portion 411k are continuous with each other. Note that in the ceiling wall 411d of the housing 411, each of the high ceiling portions 411i and 411j corresponds to the bulge portion.

The ceiling wall 411d of the housing 411 is disposed such that the high ceiling portions 411i and 411j and the recessed portion 411k have distances from the instrument panel member 13 in a case where the vehicle is in the ordinary state. The distances from the instrument panel member 13 are the same as the distances G1 and G2 in the above first embodiment.

In the vehicle according to the present embodiment, the ceiling wall 411d of the housing 411 has the front high ceiling portion 411i in a front portion and has the rear high ceiling portion 411j in a rear portion, and those high ceiling portions 411i and 411j function as the bulge portions. That is, even when the vehicle according to the present embodiment undergoes a collision and the housing 411 is likely to be displaced to the front side or the rear side, the high ceiling portions 411i and 411j abut the instrument panel member 13, and displacement of the housing 411 is thereby regulated. Thus, similarly to the above first embodiment to the above third embodiment, the vehicle according to the present embodiment can secure the deployment stability of the knee airbag 413.

Further, because the vehicle according to the present embodiment has the high ceiling portions 411i and 411j in the front portion and the rear portion of the ceiling wall 411d of the housing 411 in the glove box 41, the volume of the storage space of the glove box 41 can be secured largely.

Fifth Embodiment

Figure 10:
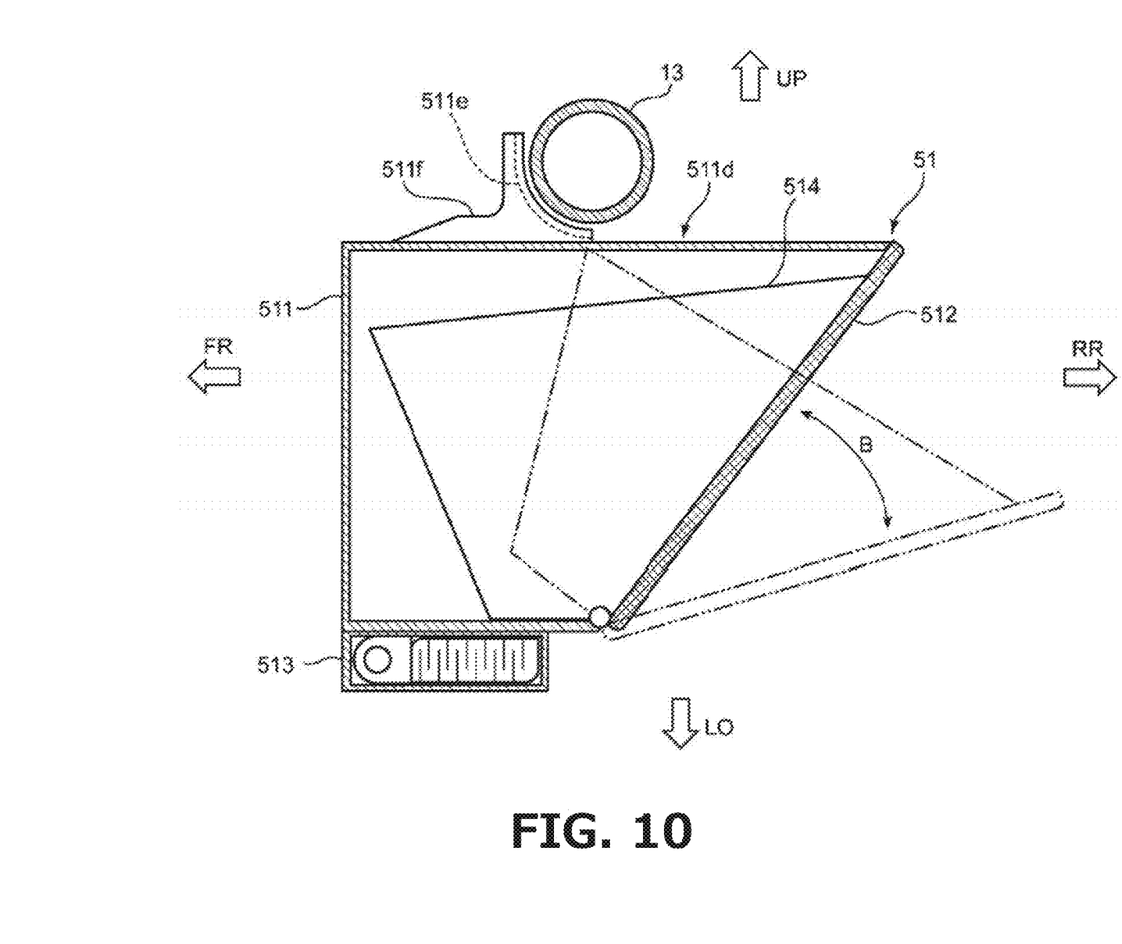
FIG. 10 is a perspective view illustrating a configuration of a glove box in a vehicle according to a fifth embodiment.

A vehicle according to a fifth embodiment will be described by using FIG. 10. Note that FIG. 10 illustrates a glove box 51 by extracting only that. For parts which are not illustrated, the same configurations as those in the above first embodiment to the above fourth embodiment are employed.

As illustrated in FIG. 10, the glove box 51 has a housing 511 as an outer shell, an internal housing 514 as an inner shell, and a box lid 512 which is fixed to the internal housing 514 and is capable of opening and closing an opening of the housing 511 on the rear side as an arrow B. Furthermore, a knee airbag 513 is fixed to a lower portion of the housing 511. A configuration of the knee airbag 513 is the same as that of the knee airbag 113 or the like of the above first embodiment.

In the glove box 51 of the present embodiment, a ceiling wall 511d of the housing 511 configuring the outer shell is provided with a displacement regulation wall portion 511e and displacement regulation ribs 511f.

Because the vehicle according to the present embodiment is the same as the vehicle of the above first embodiment except the point that the internal housing 514 is provided in an internal portion of the housing 511 and the internal housing 514 is capable of being opened and closed together with the box lid 512, the same effects as those of the above first embodiment can be obtained.

[Modifications]

In the above first embodiment to the above third embodiment and the above fifth embodiment, the bulge portion is provided on the front side of the vehicle-body fixation portion (instrument panel member 13), and in the above fourth embodiment, the bulge portions are provided in front and rear of the vehicle-body fixation portion (instrument panel member 13); however, in the present disclosure, the bulge portion can also be provided only on the rear side of the vehicle fixation portion. That is, depending on how the posture of the housing is changed in deployment of the knee airbag, a formation part of the bulge portion relative to the vehicle-body fixation portion may be set.

Further, in the above first embodiment, the above second embodiment, and the above fifth embodiment, the bulge portions are configured with the displacement regulation wall portions 111e, 211e, and 511e and the displacement regulation ribs 111f, 211f, and 511f which are respectively integrally formed, but the present disclosure is not limited by those. For example, the bulge portion may be configured only with a wall portion which extends upward, or the bulge portion may be configured only with one or a plurality of ribs each of which is provided to stand upward.

Further, the vehicle-body fixation portion which the bulge portion abuts is not necessarily required to be the instrument panel member and may be the instrument panel member or the instrument panel or may be a part of the vehicle body structure.

Further, in the above first embodiment to the above fifth embodiment, as examples of the storage box, the glove boxes 11, 21, 31, 41, and 51 which respectively have the box lids 112, 212, 312, 412, and 512 are employed, but in the present disclosure, the storage box is not limited to the glove box. For example, in a case where the instrument panel is provided with another storage box than the glove box, when the knee airbag and the bulge portion are provided in the above storage box, similar effects to the above can also be obtained.

Further, in the above first embodiment to the above fifth embodiment, a configuration is employed in which the bulge portion is integrally formed with the ceiling wall of the housing, but in the present disclosure, a configuration may be employed in which the ceiling wall of the housing and the bulge portion are provided as separate bodies and are fixed to each other. In this case, similar effects to the above can also be obtained.

What is claimed is:

1. A vehicle including a knee airbag arranged in front of a passenger seat, the vehicle comprising:
    a storage box which is provided in a front portion of the passenger seat in an instrument panel extending in a vehicle width direction and which has a housing demarcating a storage space;
    a vehicle-body fixation portion which is fixed to a vehicle body and is arranged above the housing; and
    the knee airbag which is fixed to a lower portion of the housing and is capable of being deployed rearward and downward, wherein
    the housing has a ceiling wall which covers a portion above the storage space and a plurality of support portions which are supported by the instrument panel, and
    the ceiling wall has a bulge portion which bulges upward compared to another portion of the ceiling wall and is spaced apart from the vehicle-body fixation portion by a distance such that the bulge portion abuts the vehicle-body fixation portion when the knee airbag is deployed.

2. The vehicle according to claim 1, wherein
    the bulge portion is formed so as to be positioned on a front side relative to the vehicle-body fixation portion.

3. The vehicle according to claim 2, wherein
    at least a part of the support portions among the plurality of support portions are arranged on an upper side and on a rear side of the knee airbag.

4. The vehicle according to claim 1, wherein
    the bulge portion
    is arranged in a position spaced apart from the vehicle-body fixation portion in a state where the knee airbag is not yet deployed, and regulates further displacement of the housing by a reaction force from the vehicle-body fixation portion in a state where the bulge portion abuts the vehicle-body fixation portion due to displacement of the housing, the displacement accompanying deployment of the knee airbag.

5. The vehicle according to claim 1, wherein
the knee airbag has an airbag main body as a bag body, an inflator which is capable of supplying gas to an internal portion of the airbag main body, and an airbag lid, which covers a portion below the airbag main body and a rear portion of which opens when the airbag main body expands.

6. The vehicle according to claim 5, wherein
the airbag main body is arranged on an upper side of the airbag lid and on a rear side of the inflator.

7. The vehicle according to claim 1, wherein
a side wall of the housing has a reinforcement portion which is formed to extend from a lower end portion toward an upper end portion and which reinforces rigidity of the side wall.

8. The vehicle according to claim 1, wherein
the housing has a pair of opposing side walls,
the plurality of support portions is disposed on the side walls, and
each of the support portions extends outward from one of the side walls in a left-right direction.

9. The vehicle according to claim 3, wherein
the housing has a pair of opposing side walls,
the plurality of support portions is disposed on the side walls, and
each of the support portions extends outward from one of the side walls in a left-right direction.

10. The vehicle according to claim 1, wherein
when viewed in the vehicle width direction, a bottom part of the housing is shorter than the ceiling wall and positioned toward a vehicle front side, and
a lid of the storage box has a trapezoidal shape which is inclined to a vehicle rear side and toward a vehicle upper side.

11. The vehicle according to claim 2, wherein
when viewed in the vehicle width direction, a bottom part of the housing is shorter than the ceiling wall and positioned toward a vehicle front side, and
a lid of the storage box has a trapezoidal shape which is inclined to a vehicle rear side and toward a vehicle upper side.

12. The vehicle according to claim 4, wherein
when viewed in the vehicle width direction, a bottom part of the housing is shorter than the ceiling wall and positioned toward a vehicle front side, and
a lid of the storage box has a trapezoidal shape which is inclined to a vehicle rear side and toward a vehicle upper side.

13. The vehicle according to claim 5, wherein
when viewed in the vehicle width direction, a bottom part of the housing is shorter than the ceiling wall and positioned toward a vehicle front side, and
a lid of the storage box has a trapezoidal shape which is inclined to a vehicle rear side and toward a vehicle upper side.

14. The vehicle according to claim 7, wherein
when viewed in the vehicle width direction, a bottom part of the housing is shorter than the ceiling wall and positioned toward a vehicle front side, and
a lid of the storage box has a trapezoidal shape which is inclined to a vehicle rear side and toward a vehicle upper side.

* * * * *